Jan. 11, 1955

H. DÖNGES ET AL 2,699,347

DETACHABLE CONNECTION BETWEEN A SPINDLE
AND A PUSH-ON HANDLE

Filed April 13, 1951

Inventors:
Hans Dönges and
Franz Joseph Schuppert
By Jones, Tesch + Darbo
Attys.

United States Patent Office 2,699,347
Patented Jan. 11, 1955

2,699,347

DETACHABLE CONNECTION BETWEEN A SPINDLE AND A PUSH-ON HANDLE

Hans Dönges, Remscheid, and Franz Josef Schuppert, Koln-Sulz, Germany, assignors to Johann Vaillant Kommanditgesellschaft, Remscheid, Germany Application April 13, 1951, Serial No. 220,767

1 Claim. (Cl. 287—53)

This invention relates to detachable connections between a spindle, preferably a valve spindle, and a push-on handle.

It is known to put a handle detachably and relatively non-turnably on the end of a spindle, preferably a valve spindle. In such a known arrangement, a resilient member, for example a retaining ring, embraces a conical surface of the spindle, so that the handle, on being tightened, is kept on the spindle. Locking against turning is accomplished by means of a key or pin which projects from the spindle and which is inserted into a corresponding recess in the handle. Such a construction of the detachable connection has two serious disadvantages which are to be obviated by the present invention, namely, the handle can be pushed on only at a definite position which must first of all be found, and there is always the danger of injuring oneself on the projecting pin or key when the handle is pulled off by overcoming the spring tension of the retaining ring.

In accordance with the present invention, a connection without a projecting member is accomplished in that the end of the spindle is formed as a cone and tightened in a corresponding hole in the handle. The cone may be provided with external toothing and the handle with corresponding internal toothing. However, in many cases, this is not at all necessary. A sufficiently tight fit of the handle is already obtainable by providing the conical end of the spindle with bearing surfaces, hence, for example, by designing it as a square cone and inserting it into a corresponding conical blind hole in the handle. Sufficient locking against relative turning of the handle is obtained even if this hole is not conical but straight.

However, the simplest construction of the connection may be obtained by designing the cone on the spindle as a simple friction cone which is tightened to an internal cone in the handle. The tightening force may be so proportioned that the handle is securely clamped on the friction cone and can be turned thereon only after a considerable peripheral force is exerted on the handle. The closing pressure of valves can thus be limited.

Most desirably, the end of the spindle is formed as a double cone, the outer cone being tightened, in the manner described, in a blind hole in the handle, whilst the lower cone is, for the purpose of exerting the tightening force, surrounded by a shrink ring which is so disposed within the handle that it is inaccessible from the outside.

In order to explain the invention further several embodiments thereof will now be described.

Figure 1:
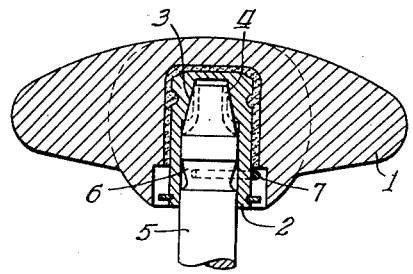
Figure 1 is a vertical sectional view of a construction embodying the present invention, the spindle being shown in elevation.
Figure 1A:
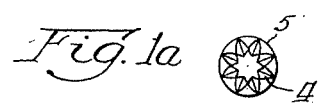
Figure 1a is an upper end view of the spindle shown in Fig. 1.
Figure 1B:
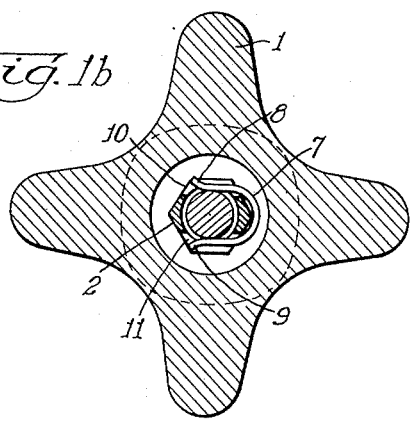
Figure 1b is a cross section of the structure of Fig. 1 taken substantially in the plane of the spring.
Figure 2:
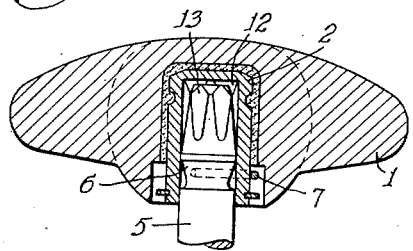
Figure 2 is a view somewhat similar to Fig. 1 but showing a modification.
Figure 2A:
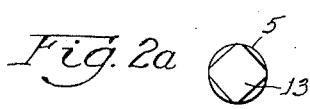
Figure 2a is an upper end view of the spindle shown in Fig. 2.
Figure 3:
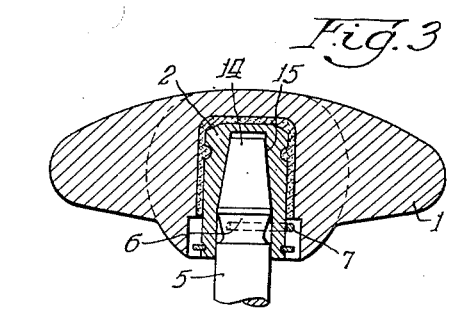
Figure 3 shows a further modification.
Figure 3A:
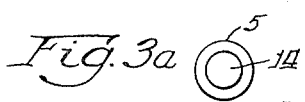
Figure 3a is an upper end view of the spindle shown in Fig. 3.

In all of the embodiments illustrated in Figs. 1 to 3, a metallic sleeve 2 of hexagonal cross-section is cemented into the handle 1 of ceramic material. In the embodiment illustrated in Fig. 1, this sleeve 2 has conical internal toothing 3 engaging corresponding external toothing 4 on the end of the valve spindle 5. The valve spindle 5 also has a conical recess 6, so that a double cone provided by a first cone 4, and a second cone 6 is formed. The cone 6 is embraced by a U-shaped spring ring 7, the legs 8 and 9 of which extending through recesses 10 and 11 in the sleeve 2. The spring ring 7, being so disposed within the handle 1 that it is inaccessible from the outside, exerts pressure upon the cone 6, thus keeping the conical toothing 3 and 4 in tight engagement with each other. On pulling off the handle 1 and pushing it on, the spring ring 7 is spread wide by the cone 6. The toothing 3 and 4 are advantageously made with pointed teeth, so that practically they engage in every position.

In the embodiment shown in Fig. 2, the sleeve 2 has a straight square hole 12. The valve spindle 5 is formed as a conical square 13 at its end. The square 13 is forced into the square hole 12 by the action of the spring 7, so that the handle 1 is mounted on the spindle 5 non-turnably in relation to the latter.

The end of the spindle may, as shown in Fig. 3, be formed as a friction cone 14 and, the square hole 12 in the sleeve 2 may be dispensed with and in place thereof an appropriate conical hole may be provided. The friction cone 14 will be tightened by the spring 7 and acts as friction coupling between the spindle 5 and the handle 1. On excessive tightening of the valve spindle 5, the handle 1 turns on the friction cone 14, so that no harmful closing pressure can be exerted upon the valve (not shown) belonging to the spindle 5.

What is claimed is:

The combination of a valve spindle or the like and a push-on handle therefor, comprising, a double cone formation at the handle-attaching end of the spindle, said formation being formed of a first cone and a second cone, said cones having their bases adjacent and tapering in a reduced taper therefrom respectively in opposite directions, the smaller end of the second cone being of a diameter smaller than the diameter of the spindle whereby to provide an annular shoulder on the spindle adjacent said smaller end, the first cone having an axially outwardly extending portion having a non-circular cross-section formed by angularly related faces on said extending portion, a blind hole in the handle, a sleeve in said hole, means locking the sleeve in the hole, said sleeve being arranged to receive the said cone formation and having walls conforming to said non-circular cross-section to lock the handle rotatively with respect to the spindle, a U-shape spring ring in said hole having legs yieldable laterally away from said formation under the influence of movement of the first cone into the sleeve and to spring into the space between the smaller end of the second cone and said shoulder to yieldably lock the handle axially to said spindle, said spring being arranged to yield also under the influence of the second cone to permit withdrawal of the spindle from the handle, said hole being laterally enlarged at its entrance end adjacent said spring ring and said sleeve being cut away to pass the legs of the spring ring therethrough, and means carried by the sleeve closing the hole enlargement while leaving the interior of the sleeve open to receive the said cone formation therein.

References Cited in the file of this patent

UNITED STATES PATENTS

| | | |
|---|---|---|
| 859,200 | Clark | July 9, 1907 |
| 1,512,702 | McCarty | Oct. 21, 1924 |
| 1,882,625 | Jacobi | Oct. 11, 1932 |

FOREIGN PATENTS

| | | |
|---|---|---|
| 708,740 | Germany | July 28, 1941 |
| 857,804 | France | Oct. 1, 1940 |